United States Patent
La Cascia, Jr. et al.

(10) Patent No.: US 6,772,107 B1
(45) Date of Patent: Aug. 3, 2004

(54) SYSTEM AND METHOD FOR SIMULATING ACTIVITY ON A COMPUTER NETWORK

(75) Inventors: Leo J. La Cascia, Jr., Highlands Ranch, CO (US); James E. Downum, Denver, CO (US)

(73) Assignee: J.D. Edwards World Source Company, Denver, CO (US)

(*) Notice: Subject to any disclaimer, the term of this patent is extended or adjusted under 35 U.S.C. 154(b) by 0 days.

(21) Appl. No.: 09/436,686

(22) Filed: Nov. 8, 1999

(51) Int. Cl.⁷ .............................................. G06F 17/50
(52) U.S. Cl. ........................ 703/21; 703/22; 703/27; 714/47; 714/48; 709/223; 709/224
(58) Field of Search ............................... 709/223, 224, 709/220, 221; 703/17, 19, 20, 21, 22, 2; 714/47, 48

(56) References Cited

U.S. PATENT DOCUMENTS

| | | | | |
|---|---|---|---|---|
| 5,086,386 A | * | 2/1992 | Islam | 707/202 |
| 5,261,097 A | * | 11/1993 | Saxon | 709/106 |
| 5,410,681 A | * | 4/1995 | Jessen et al. | 703/27 |
| 5,600,789 A | * | 2/1997 | Parker et al. | 714/38 |
| 5,640,537 A | * | 6/1997 | Jessen et al. | 703/23 |
| 5,669,000 A | * | 9/1997 | Jessen et al. | 717/127 |
| 5,809,282 A | * | 9/1998 | Cooper et al. | 709/226 |
| 5,812,780 A | | 9/1998 | Chen et al. | |
| 5,819,066 A | | 10/1998 | Bromberg et al. | |
| 5,881,268 A | * | 3/1999 | McDonald et al. | 703/21 |
| 5,907,696 A | * | 5/1999 | Stilwell et al. | 703/13 |
| 5,946,474 A | * | 8/1999 | Skogby | 703/13 |
| 5,958,008 A | * | 9/1999 | Pogrebisky et al. | 709/223 |
| 5,974,572 A | * | 10/1999 | Weinberg et al. | 714/47 |
| 5,987,565 A | * | 11/1999 | Gavaskar | 711/112 |
| 6,002,871 A | * | 12/1999 | Duggan et al. | 717/135 |
| 6,044,398 A | * | 3/2000 | Marullo et al. | 709/219 |
| 6,074,427 A | * | 6/2000 | Fought et al. | 703/21 |
| 6,134,514 A | * | 10/2000 | Liu et al. | 703/17 |
| 6,167,534 A | * | 12/2000 | Straathof et al. | 714/38 |
| 6,249,886 B1 | * | 6/2001 | Kalkunte | 714/47 |
| 6,308,146 B1 | * | 10/2001 | La Cascia et al. | 703/22 |
| 6,324,492 B1 | * | 11/2001 | Rowe | 703/13 |
| 6,412,015 B1 | * | 6/2002 | Navare et al. | 709/250 |
| 6,434,513 B1 | * | 8/2002 | Sherman et al. | 702/186 |
| 6,449,739 B1 | * | 9/2002 | Landan | 714/47 |
| 6,549,944 B1 | * | 4/2003 | Weinberg et al. | 709/224 |
| 6,564,342 B2 | * | 5/2003 | Landan | 714/48 |

* cited by examiner

Primary Examiner—W. Thomson
(74) Attorney, Agent, or Firm—Sheridan Ross P.C.

(57) ABSTRACT

The system for simulating user activity on a multi-tier computer network includes an event capture database for capturing interface level information and kernel level information associated with the interface level information. A virtual script editor module creates a virtual script from the captured interface level information and captured kernel level information to simulate user activity on the network. A virtual script playback module is responsive to the virtual script to produce virtual kernel level information indicative of network and server activity associated with a virtual user.

25 Claims, 10 Drawing Sheets

SYSTEM AND METHOD FOR SIMULATING ACTIVITY ON A COMPUTER NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Technical Field

The present invention relates in general to a system and method for simulating user activity on a computer network. The invention more particularly relates to a system and method for simulating user activity on a multi-tiered computer network to help analyze the performance of network components.

2. Background Art

Client/server computing has been embraced by the business enterprise community as an effective means for sharing information across an enterprise. By utilizing a client/server computer network, an enterprise was able to increase its efficiency by providing access to a common source of information for use by a large number of users when executing various application components of enterprise software.

A typical client/server computer network included a client application for requesting services from a server application. The client application was maintained on a client computer while the server application was maintained on a server computer. To enable the client computer to communicate with the server computer, the client computer was connected to the server computer by a communication network. For clarity, the client application/client computer combination is referred to herein as the "client" and the server application/server computer combination is referred to as the "server".

The client/server computer network was especially suitable for a business enterprise because the client/server computer network enabled a large number of users to access enterprise information using clients connected to a server over the communication network. In this way it was possible for all of the clients to access the server for sharing the enterprise information and resources associated with the server.

In order to accommodate all of the requests for services received from the clients, the server had to be sized according to the expected user activity. By analyzing the performance of the server when responding to the requests for services received from the clients, it was possible to determine if the server was sized properly for the number of clients in the client/server computer network.

Ensuring that the server performance analysis was accurate required the reproduction of all of the expected requests for services generated by user activity on the clients (the "expected load"). One method for reproducing the expected load involved connecting a group of clients, corresponding in number to the expected load, to the server wherein each client generated requests for services from the server. This method taxed the human resources of the business enterprise as it required each one of the clients on the network to be operated by a user to generate the requests for services needed to analyze the server's performance. In addition, this method was somewhat expensive due to the costs for obtaining and maintaining the group of clients.

In order to reproduce the expected load, yet reduce the number of clients required, a method for simulating multiple user activity on a single client was developed. This method was less taxing on human resources than the multiple user/client system. For example, systems for simulating client requests for services are shown and described in U.S. Pat. Nos. 5,812,780 and 5,819,066.

U.S. Pat. Nos. 5,812,780 and 5,819,066 describe testing tools including predefined client profiles or execution parameters that are used by a program to generate processes that simulate user activity for multiple users over a computer network. The client profiles and execution parameters are selected prior to execution of the program, and produce the processes that define an artificial representation of the expected load on a server. In this regard, the client profiles and execution parameters do not consider the actual requests for services generated by the client application. Instead, the patented systems attempt to simulate the requests for services without accounting for any variation in the request for service that might be generated by the client application. Commercially available testing tools included the WINRUNNER testing tool marketed by Mercury Interactive Corporation of Sunnyvale, Calif.

Therefore, it would be highly desirable to have a new and improved system and method for simulating user activity on a computer network, wherein requests for services generated by a client application are used to enhance the simulation of user activity on the network.

Load simulation systems testing tools, in conjunction with "software hooks" placed in a subject client' database middleware, enabled user input to an application to be simulated and also enabled calls made to a database server by the database middleware to be recorded. Once recorded, the database calls were capable of being reproduced and transmitted directly to the database server to simulate user activity.

While such a system enabled the simulation of user activity on a 2-tier computer network, it was inadequate for accurately simulating user activity on a computer network having three or more tiers, also known as a N-tier or multi-tier computer network.

A 2-tier network generally included a group of clients connected to a database server. The database server maintained application information required to process requests for application services received from the clients. The clients maintained all business function information required by the clients.

Multi-tier computer networks facilitate a wider distribution of information across a business enterprise than is possible with a 2-tier computer network. A multi-tier computer network generally includes a group of clients connected to a database server and one or more additional servers, such as an application server, where the application server performs business transaction processing required by the clients.

The known load simulation system for simulating user activity on a 2-tier computer network described above was simply not adequate for simulating user requests for services from a database server and an application server on a multi-tier computer network. Consequently, the 2-tier simulation system was not able to accurately reproduce the expected load on the database server and the application server, and thus the performance of the network components could not be analyzed adequately.

Furthermore, changes to the configuration of objects distributed across the multi-tier computer network could not be accommodated easily by the 2-tier simulation systems. A recorded call associated with a reconfigured object could not properly simulate user activity and would have to be re-recorded or manually reconfigured to accommodate the change.

Therefore, it would also be highly desirable to have a new and improved system and method for simulating user activity on a computer network, wherein the user activity is simulated to facilitate the analysis of performance characteristics of a multi-tier computer network's components. Such a system and method should accommodate changes to the multi-tier computer network without requiring modification to the system.

SUMMARY OF THE INVENTION

Therefore, the principal object of the present invention is to provide a new and improved system and method for simulating user activity on a multi-tier computer network, wherein user activity on the network is simulated according to requests for services made by a client application. Such a system should facilitate the analysis of performance characteristics of network components of a multi-tier computer network, and should easily accommodate changes to the configuration of objects distributed across the network.

Briefly, the above and further objects of the present invention are realized by providing a new and improved user activity simulation system and method which accurately simulates user activity on a multi-tier computer network, and which is not affected by changes to the configuration of objects distributed across a network.

The system for simulating user activity on a multi-tier computer network includes an event capture database for capturing interface level information and kernel level information associated with the interface level information. A virtual script editor module creates a virtual script from the captured interface level information and captured kernel level information to simulate user activity on the network. A virtual script playback module is responsive to the virtual script to produce virtual kernel level information indicative of network and server activity associated with a virtual user.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
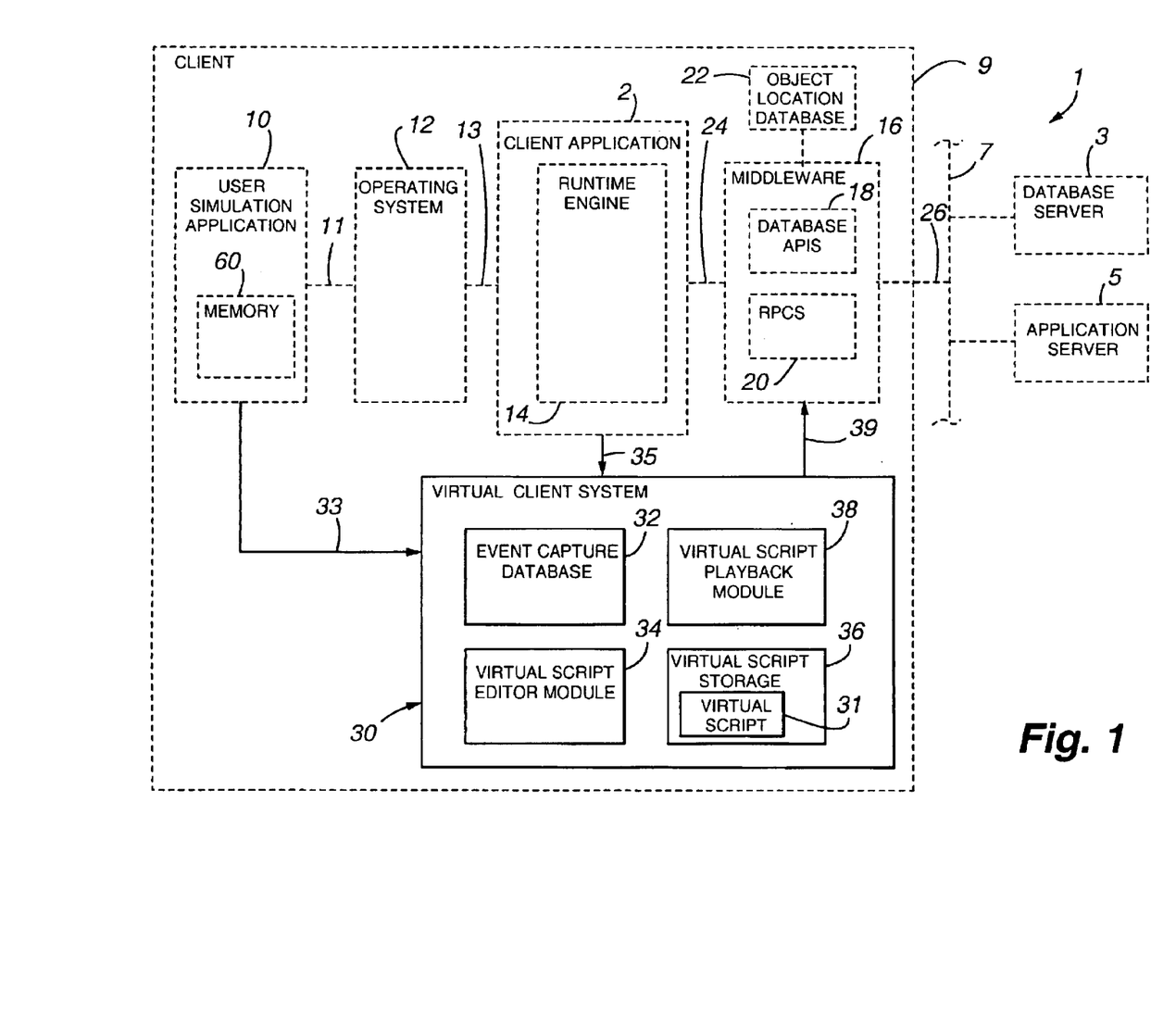
FIG. 1 is a block diagram illustrating a system for simulating user activity on a multi-tier computer network, wherein the system is constructed in accordance with the present invention.

Referring now to FIG. 1, there is shown a virtual client system 30 constructed in accordance with the present invention. The system 30 enables the simulation of user activity on a multi-tier computer processing system 1 to help analyze of the performance of network components.

The multi-tier computer processing system 1 includes a client 9 connected to a database server 3 and an application server 5 by a communication network 7. The client 9 communicates with the database server 3 and the application server 5 over the network 7 via a middleware component 16. The database server 3 includes a database (not shown) and a database server application (not shown) for responding to requests for database services from the client 9. The application server 5 includes application information storage (not shown) and an application server application (not shown) for responding to requests for application services from the client 9. The communication network 7 comprises a local area network (LAN) or a wide area network (WAN), but may also comprise telecommunication networks including the global computer network referred to as the Internet, as well as other networks capable of transmitting information between network components.

The system 30 is connected to a user simulation application 10, a client application 2, and the middleware component 16 of the client 9. Utilizing interface level information 33 and kernel level information 35 obtained from the user simulation application 10 and the client application 2 respectively, the system 30 enables a virtual script 31 to be created, stored and played back to simulate one or more users on the processing system 1. The virtual script 31 corresponds to a virtual client (not shown) and can be run or played back to produce virtual kernel level information 39 indicative of requests for service associated with the virtual client.

The system 30 includes an event capture database 32, a virtual script editor module 34, a virtual script storage 36 and a virtual script playback module 38. The event capture database 32 facilitates capturing the interface level information 33 as well as the kernel level information 35 associated with the interface level information 33. The virtual script editor module 34 uses the captured interface level information 33 and captured kernel level information 35 maintained by the event capture database 32 to create the virtual script 31. The virtual script 31 describes a desired sequence of commands, and associated parameters, associated with the virtual kernel level information 39, and is stored in the virtual script storage 36. When the virtual script 31 is executed, or played, by the virtual script playback module 38, the virtual script 31 produces the virtual kernel level information 39.

To analyze the performance of the components of the processing system 1, such as the database server 3 and the application server 5, the user activity generated by all of the expected clients on the processing system 1 must be simulated. By creating and storing a group of virtual scripts on a single client, such as the client 9, it is possible to simulate network user activity for a group of virtual clients from a single client computer. The performance of the servers 3 and 5 can then be determined properly when the group of virtual clients represents the expected load on the servers 3 and 5.

Figure 2:
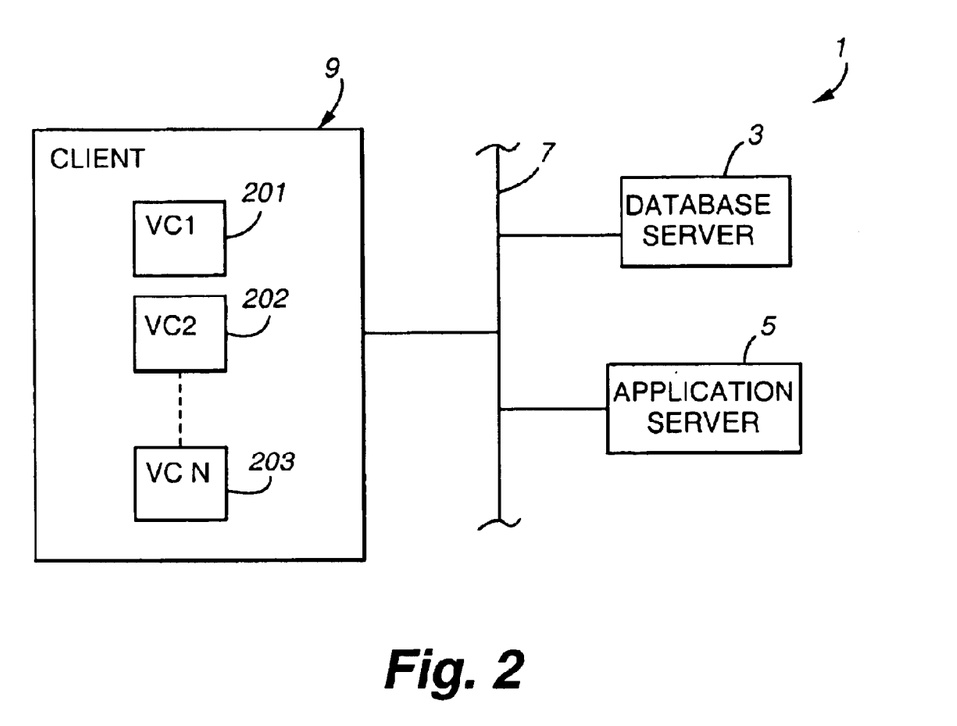
FIG. 2 is a block diagram illustrating a single client computer simulating a group of virtual clients on the system of FIG. 1.

A group of virtual clients, including virtual client one (VC 1) 201, virtual client two (VC 2) 202 and virtual client N (VC N) 203, is shown in FIG. 2. Each one of the virtual clients 201–203 has an associated virtual script maintained in the virtual script storage 36 and which is substantially similar to the virtual script 31 (FIG. 1). In the preferred embodiment, each of the virtual clients 201, 202 and 203 corresponds to a unique user activity to be simulated on the processing system 1 according to the corresponding virtual scripts. Thus, N number of user activities associated with the virtual clients 201, 202 and 203 can be simulated on the processing system 1 using the same client computer 9, where the number N is determined by the processing and storage capabilities of the client 9.

Considering now the client 9 in more detail with reference to FIG. 1, the user simulation application 10 generates interface level information 11 indicative of a simulated user's input for controlling the operation of the client application 2. The user simulation application 10 includes a memory 60 for maintaining data lists required for simulating the operation of the client application 2 without the manual input of information by a user. An exemplary user simulation application 10 is described in co-owned, and co-pending, U.S. patent application Ser. No. 09/183,869, entitled "SYSTEM AND METHOD FOR SIMULATING USER INPUT TO CONTROL THE OPERATION OF AN APPLICATION," which patent application is incorporated by reference as if fully set forth herein.

An operating system 12 comprising operating system software such as MICROSOFT WINDOWS NT operating system software from Microsoft Corporation of Redmond, Wash., provides a graphical user interface (GUI) for the client application 2. The operating system 12 creates and manages "windows" for the GUI, and is responsive to the interface level information 11 for generating input information 13 to control the operation of the client application 2.

The client application 2 includes a runtime engine 14 for executing the client application 2 in accordance with the input information 13. In the preferred embodiment, the client application 2 is one application of a plurality of applications comprising enterprise software, such as ONE-WORLD enterprise software marketed by J. D. Edwards & Company of Denver, Colo. The enterprise software enables a business enterprise to perform a number of enterprise related software applications, such as accounting applications, payroll applications, manufacturing and distribution applications, while sharing resources like the database server 3 and the application server 5.

In response to the input information 13, the runtime engine 14 generates kernel level information 24 including database kernel level information and application kernel level information, wherein the kernel level information 24 is indicative of requests for service from the database server 3 and the application server 5. The kernel level information 24 is supplied to the middleware component 16 to generate user activity on the processing system 1 corresponding to the requests for services.

The middleware component 16 includes a group of database application programming interface routines (APIS) 18 and a group of remote procedure call routines (RPCS) 20. The APIS 18 are responsive to the database kernel level information from the runtime engine 14 for communicating information between the client computer 9 and the database server 3. The RPCS 20 are responsive to the application kernel level information from the runtime engine 14 for communicating information between the client computer 9 and the application server 5.

An object location database 22 coupled to the middleware component 16 provides object configuration information to the middleware component 16. The object configuration information identifies object access and location information for the objects distributed across the processing system 1 including objects required by the client 9, the database server 3 and the application server 5 when processing requests for services.

Upon the receipt of the kernel level information 24, the middleware component 16 accesses the object location database 22 to obtain the object configuration information required to satisfy the requests for services associated with the kernel level information 24. The middleware component 16 then communicates call information 26 over the network 7 for requesting database services from the database server 3 and application services from the application server 5.

Figure 3:
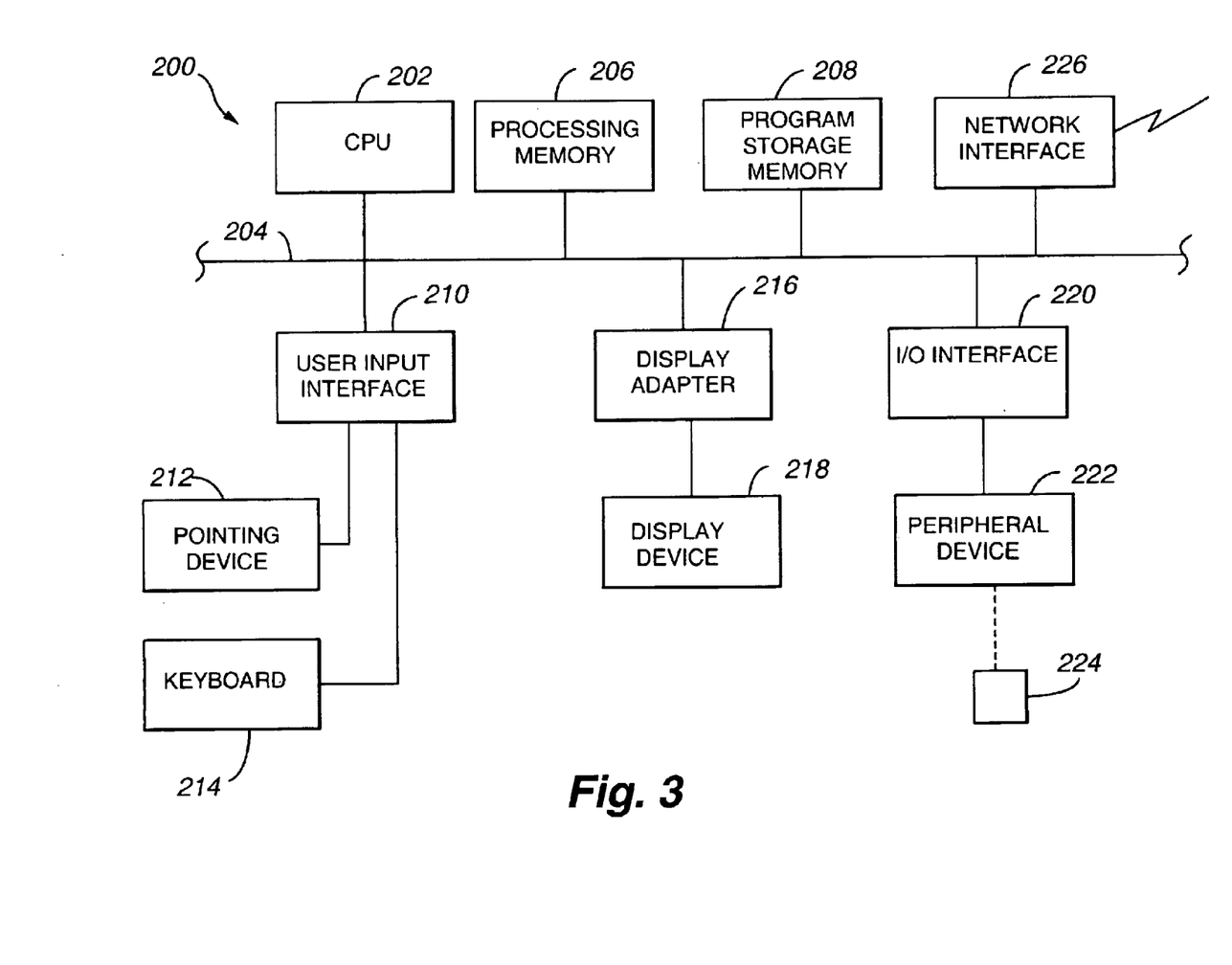
FIG. 3 is a block diagram illustrating a general purpose computing system for use in connection with the system of FIG. 1.

In the preferred embodiment, the client 9 and system 30 are implemented in a general purpose computing or information processing system 200 (FIG. 3). The processing system 200 includes a central processing unit (CPU) 202 connected by a bus 204 to a processing storage or memory device 206 for executing the user simulation application 10, the client application 2, the virtual script editor module 34 and the virtual script playback module 38 of the system 30 (FIG. 1). A program/data storage or memory device 208 maintains information required for use by the user simulation application 10 and the client application 2, including the memory 60, and also maintains the captured interface level information 33, the captured kernel level information 35 as well as the virtual script 31.

The processing system 200 further includes a user input interface 210 connected to the bus 204 for enabling the user to interact with the system 30 (FIG. 1) via a pointing device 212, such as a mouse, and also with a keyboard device 214. To provide a visual display, the processing system 200 also includes a display device 218 connected to the bus 204 through a display adapter 216.

An input/output ("I/O") interface 220 is connected to the bus 204 to permit a peripheral device 222 to interface with the processing system 200. The peripheral device 222 includes a disk drive for reading and/or writing electronic information, including the virtual script 31, to computer-usable storage medium such as a magnetic disk 224. Other peripheral devices, including tape drives and compact disk drives, can also be incorporated into the processing system 200.

A network interface 226 is also connected to the bus 204 to enable the processing system 200 to share information over the communication network 7 (FIG. 1).

Figure 4:
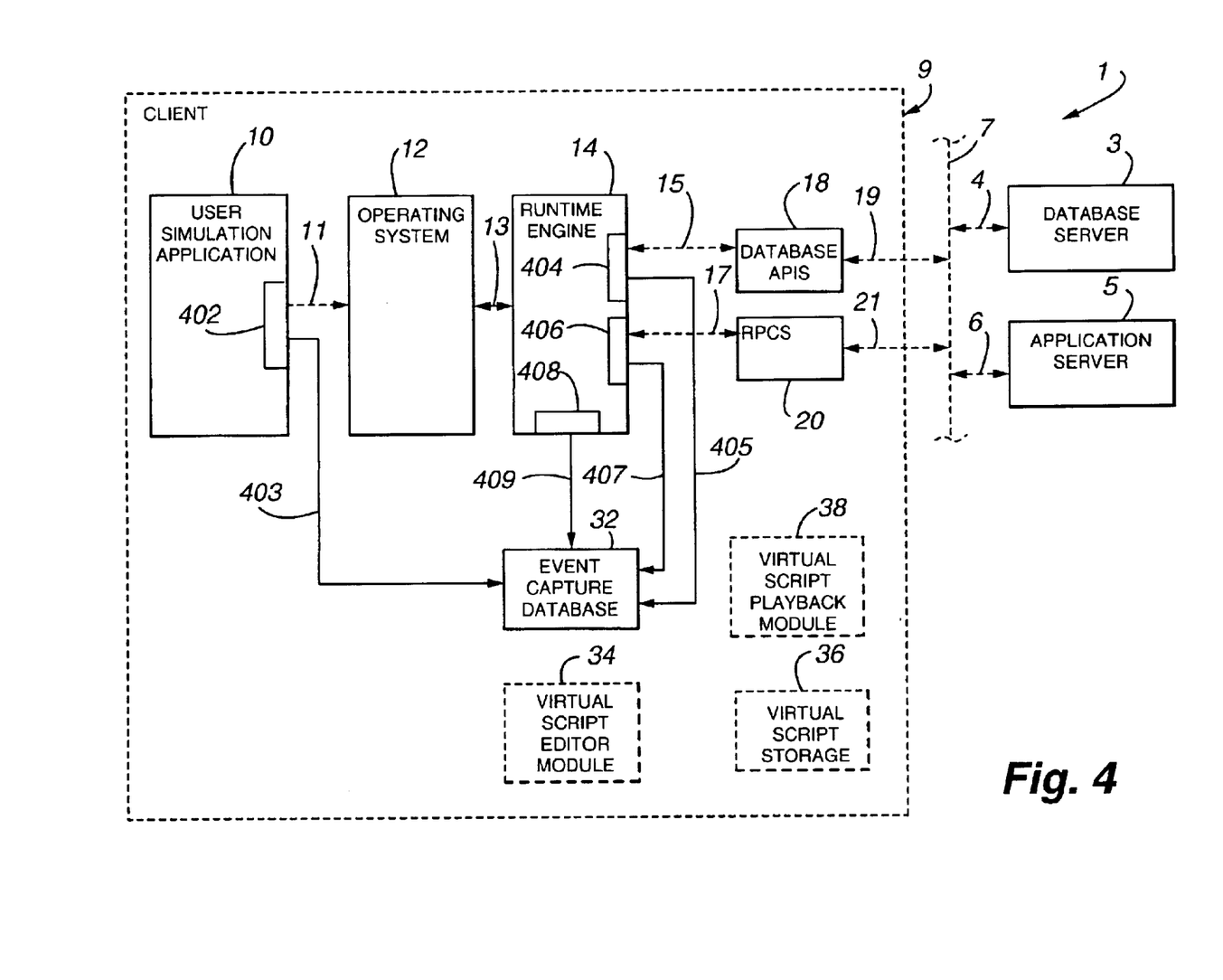
FIG. 4 is a block diagram illustrating an event capture process for the system of FIG. 1.
Figure 5:
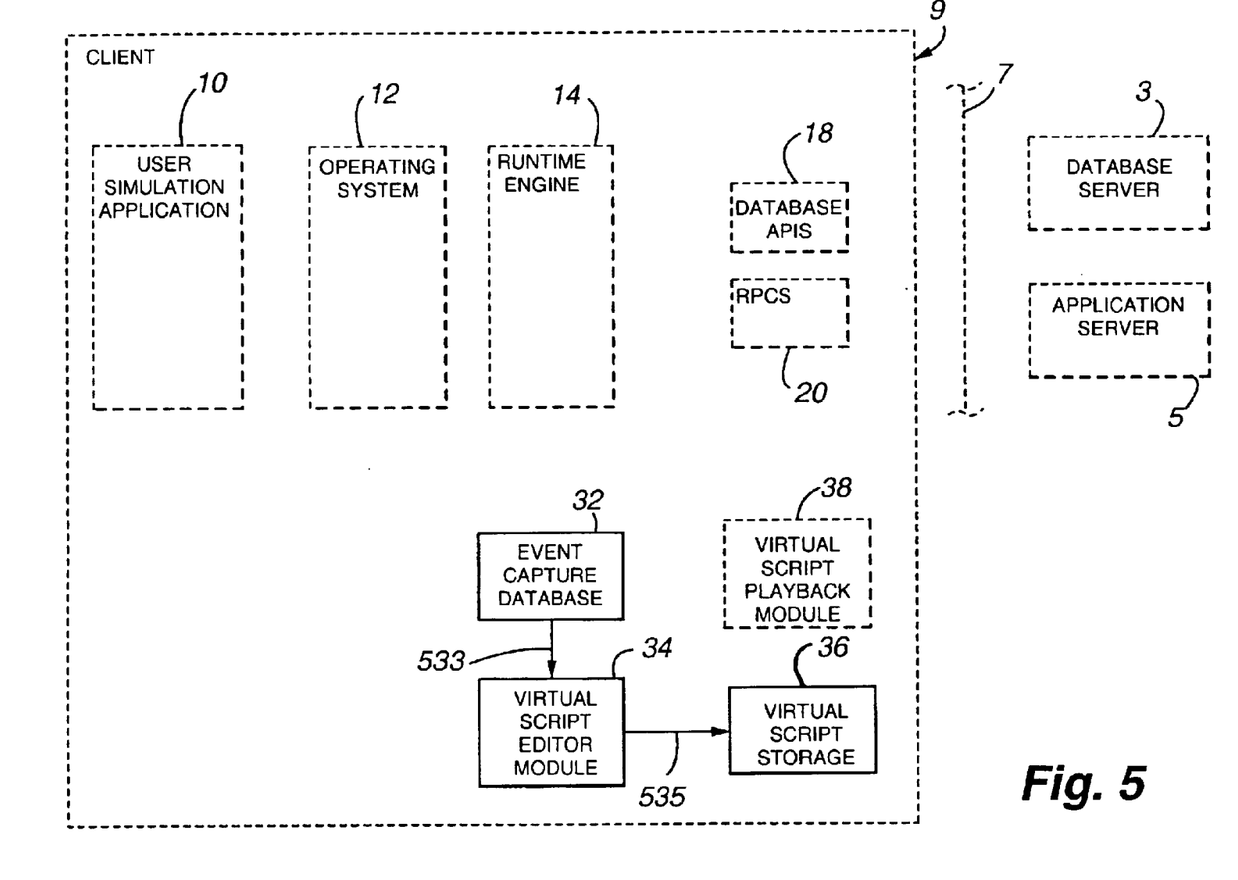
FIG. 5 is a block diagram illustrating a virtual script development process for the system of FIG. 1.
Figure 6:
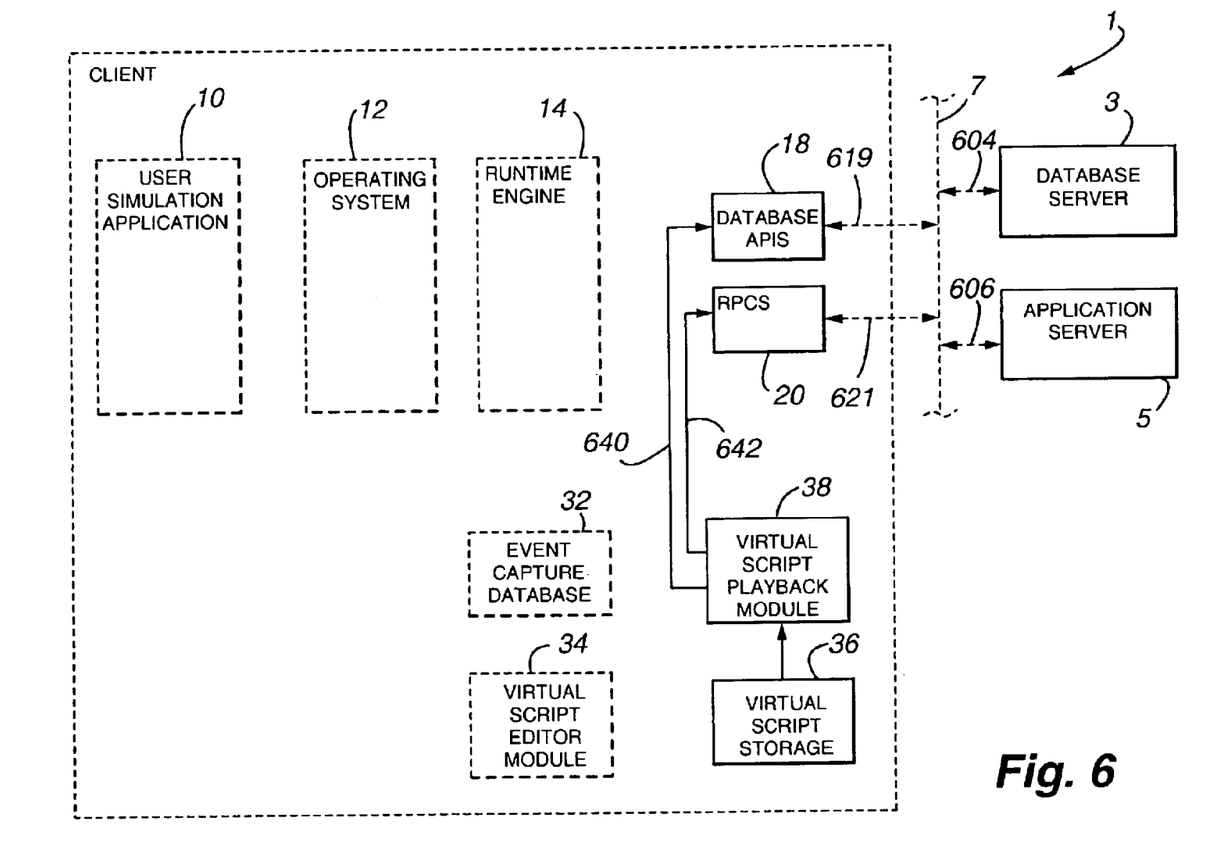
FIG. 6 is a block diagram illustrating a virtual script playback process for the system of FIG. 1.

Considering now the operation of the virtual client system 30 as shown in FIGS. 4–6, the system 30 operates in three stages: an event capture stage (FIG. 4); a virtual script development stage (FIG. 5); and a virtual script playback stage (FIG. 6). To better illustrate the operation of the system 30 relative to the entire processing system 1, the actively participating components during a particular stage are shown in solid lines while non-participating components are shown in phantom lines. In addition, solid lines show the flow of information relative to the system 30, while the flow of information outside of the system 30 is shown in dashed lines.

During the event capture stage of FIG. 4, the user simulation application 10 simulates user input by transmitting the interface level information 11 to the operating system 12. A software hook 402 in the user simulation application 10 monitors the transmission of the interface level information 11 and causes substantially similar interface level information 403 to be transmitted to the event capture database 32.

In response to receiving the interface level information 11, the operating system 12 exchanges input information 13 with the runtime engine 14 to facilitate the processing of the simulated user input. The runtime engine 14 then generates database kernel level information 15 and application kernel level information 17 indicative of requests for services associated with the interface level information 11. A software hook 404 in the runtime engine 14 monitors the transmission of the database kernel level information 15 and causes substantially similar database kernel level information 405 to be transmitted to the event capture database 32. A software hook 406 in the runtime engine 14 monitors the transmission of the application kernel level information 17 and causes substantially similar application kernel level information 407 to be transmitted to the event capture database 32.

In one example of the present invention, the interface level information 11 is indicative of the entry of new data into a data entry field of the client application 2. As the entry of new data affects the database server 3, a request to update the database information maintained at the database server 3 in the form of database kernel level information 15 is generated by the runtime engine 14. Where the data entry field has an associated business function or logic, a request for business function information maintained on the application server 5 in the form of application kernel level information 17 is generated by the runtime engine 14.

The processing of the input information 13 by the runtime engine 14 spawns multiple threads of execution information corresponding to the database kernel level information 15 and the application kernel level information 17. A software hook 408 in the runtime engine 14 monitors the thread execution information associated with the database kernel level information 15 and the application kernel level information 17, and causes substantially similar thread execution information 409 to be transmitted to the event capture database 32.

The placement of the hooks 404, 406 and 408 in the runtime engine 14 (known as "instrumentation") enables timing information and the complete set of parameters for each function call to be recorded in a serialized manner.

The database kernel level information 15 and the application kernel level information 17 are provided to the APIS 18 and the RPCS 20, wherein database request information 19 and application request information 21 are subsequently transmitted to the network 7, and on to the servers 3 and 5 as database information request 4 and application information request 6.

The servers 3 and 5 process the requests for services and return the resulting information to the APIS 18 and the RPCS 20. The retrieved information is passed on to the runtime engine 14 for further processing. The runtime engine 14 may also return information to the operating system 12 for further processing. Based upon the information returned to the runtime engine 14 by the servers 3 and 5, the runtime engine 14 may generate additional requests for database services and application services in the same manner as described above.

The captured interface level information 403, the captured database kernel level information 405, the captured application kernel level information 407, and the captured thread execution information 409 are stored in the event capture database 32. In this way, the event capture database 32 effectively captures and stores the information 403, 405, 407, and 409 as "stream of consciousness" information indicative of events generated directly or indirectly by the user simulation application 10 during a user session. The database 32 maintains a time-stamped log or event list of the captured information 403, 405, 407 and 409, including functions called, time stamps and thread identification for each function call, function parameters used, and transaction timing information, e.g., the start time and duration time of transactions by thread. Each record in the database 32 is indicative of an individual user session of the user simulation application 10. An exemplary structure for the database 32 is described in TABLE 1 below.

TABLE 1

| Column Name | Data Type | Usage |
| --- | --- | --- |
| MGMKEY | Char(10) | Machine name identifying the computer on which the data was captured. |
| MGRPTID | Int | A unique number identifying the test during which the data was captured. |
| MGTP | Char(2) | An identifier describing the type of message data stored in MGDATA. |
| MGDLEN | Int | The length, in bytes, of the data stored in MGDATA. |
| MGDATA | Binary large object | The binary message data. |

Once an individual user session is complete, and the event capture database 32 has recorded all of the events associated with the session, a virtual script such as the virtual script 31 (FIG. 1) can be created by the virtual script editor module 34 during a virtual script development stage (FIG. 5). The virtual script editor module 34 reads or accesses session record information 533 from the event capture database 32 to create virtual script information 535 indicative of the virtual script 31 for simulating user activity corresponding to the recorded user session. The virtual script information 535 is transmitted to, and maintained in, the virtual script storage 36 where the virtual script playback module 38 can access the virtual script information 535 at a later time.

As described in more detail below, the virtual script editor module 34 enables parameter values for related function calls to be linked in the virtual script 31, and also determines thread timing characteristics for thread events in the virtual script 31. By linking the parameter values and determining the thread timing characteristics in the virtual script 31, the virtual kernel level information 39 (FIG. 1) generated according to the virtual script 31 is able to substantially reproduce all of the user activity that would occur if an actual user were to interact with the application 2.

Creating additional virtual scripts can simulate the user activity for a group of users. Each virtual script corresponds to simulated user activity for a virtual client on the processing system 1. For a business enterprise utilizing accounting applications, payroll applications and manufacturing and distribution applications of an enterprise software application, one or more virtual scripts can simulate accounting activity, one or more virtual scripts can simulate payroll activity, and one or more virtual scripts can simulate manufacturing and distribution activity. In this way, the expected load on the shared resources or components of the processing system 1 for all of the desired enterprise applications can be simulated as a group of virtual clients on one or more clients, such as the client 9 (FIG. 1).

During a virtual script playback stage (FIG. 6), the virtual script playback module 38 retrieves the stored virtual script information 637 from the storage 36, and generates virtual database kernel level information 640 and virtual application kernel level information 642 based on the stored virtual script information 637. The virtual script information 637 supplies the function calls and the associated parameters to define the virtual database kernel level information 640 and the virtual application kernel level information 642. The virtual database kernel level information 640 and virtual application kernel level information 642 are supplied to the APIS 18 and the RPCS 20, and are indicative of requests for service made by a virtual client. Both the virtual database kernel level information 640 and the virtual application kernel level information 642 are supplied in accordance with the thread timing characteristics identified in the stored virtual script information 637.

The APIS 18 and RPCS 20 respond to the virtual database kernel level information 640 and the virtual application kernel level information 642 as if the information was received directly from the runtime engine 14, and generate database call information 619 and application call information 621. The database call information 619 and application call information 621 is supplied to the network 7 for exchanging information requests 604 and 606 with servers 3 and 5 according to access information.

As described above, the object location database 22 (FIG. 1) maintains the configuration information for the objects on the processing system 1. The APIS 18 and RPCS 20 access the object location database 22 to determine the configuration information for objects required to process the requests represented by the virtual database kernel level information 640 and the virtual application kernel level information 642. By simulating user activity at the kernel level, i.e., the virtual database kernel level information 640 and the virtual application kernel level information 642, the configuration information for objects maintained in the object location database 22 can be revised without requiring corresponding revisions to the virtual script 31.

The number of simulated users can be increased by providing additional clients (not shown) on the processing system 1, where each of the additional clients includes a virtual script storage for maintaining one or more virtual scripts. The additional clients further include a virtual script playback module for executing the virtual scripts. The virtual scripts can be developed on the client 9 and transferred to the additional clients via the communication network 7 or by way of a portable storage medium such as the disk 224 (FIG. 3).

Figure 7:
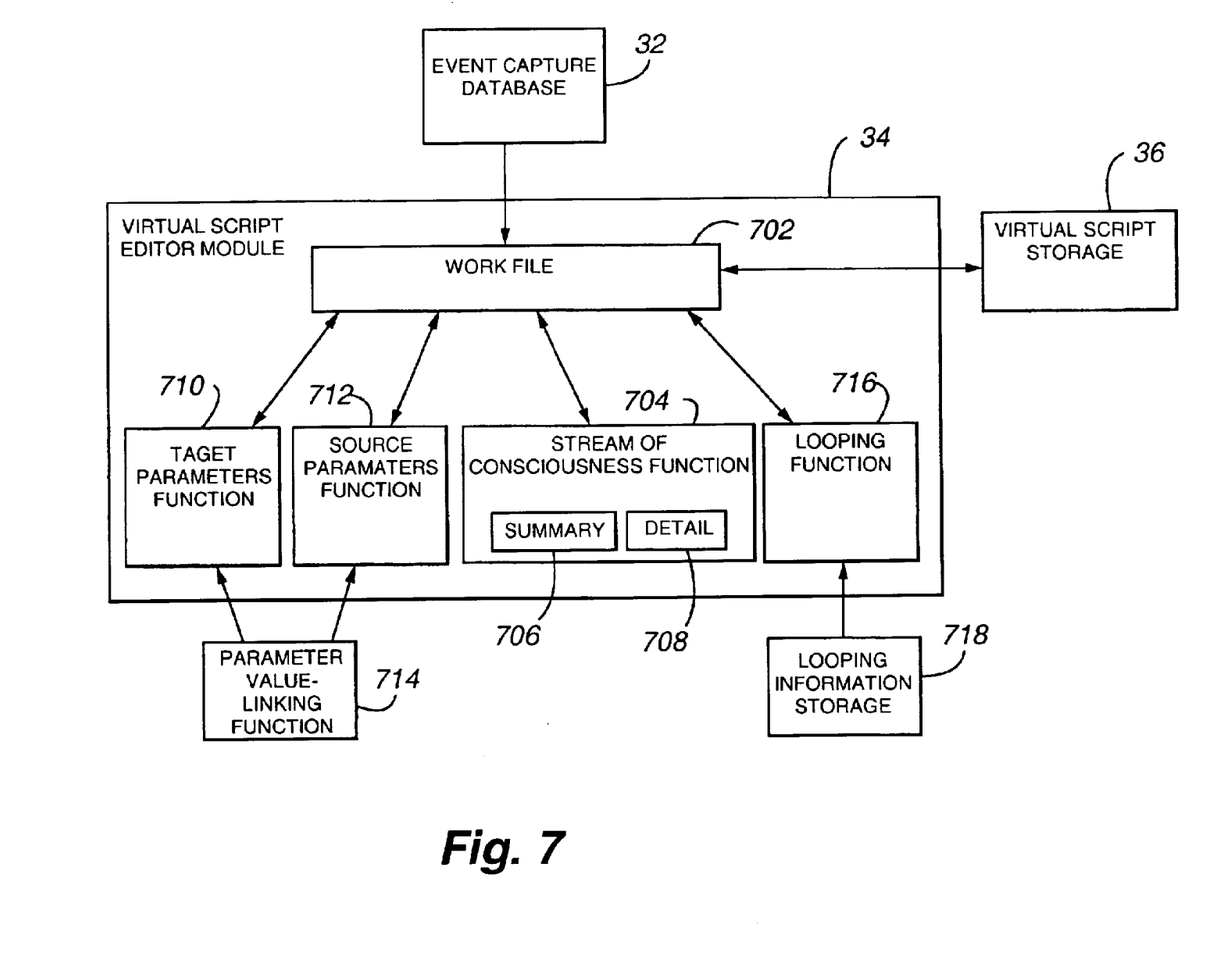
FIG. 7 is a block diagram illustrating a virtual script editor of the system of FIG. 1.

Considering now the virtual script editor module 34 in greater detail with reference to FIG. 7, the editor module 34 identifies the source and use of recorded parameters, enables the parameters to be translated to values that are appropriate at run time, identifies critical timing dependencies, ensures dynamic data is available for the playback of the virtual script 31, and identifies user supplied rules. To accomplish these goals, the editor module 34 includes a work file 702 connected to the event capture database 32 and the virtual script storage 36. The stream of consciousness information captured by the database 32 is imported to the work file 702 for enabling the creation of the virtual script 31 by the editor module 34. Once complete, the virtual script 31 is saved to the virtual script storage 36. For modifying an existing virtual script, the existing virtual script can be loaded into the work file 702 from the virtual script storage 36.

A stream of consciousness function 704 accesses the stream of consciousness information maintained in the work file 702 and enables the information to be displayed on a display device, such as the display device 218 (FIG. 3). The function 704 includes a summary function 706 for identifying starting and ending time stamps, an elapsed time for an event or API call, the event thread number and call depth, and a summary description of the event. The function 704 further includes a detail function 708 for identifying BEFORE values and AFTER values for each parameter associated with the event.

A target parameter function 710 accesses the work file 702 to enable the display of the BEFORE value of each parameter associated with an API call. A source parameter function 712 accesses the work file 702 to enable the display of each instance of the stream of consciousness information where the AFTER value of a parameter matches the BEFORE value of the parameter identified as a target parameter by the target parameter function 710, and where the time of the source API call occurs prior to the time of the target API call.

A parameter value linking function 714 enables a user to link BEFORE values identified by the target parameter function 710 with a corresponding AFTER value identified by the source parameter function 712. The starting and ending time stamps associated with the linked BEFORE values and AFTER values help determine the thread timing characteristics of a simulated application operation according to the virtual script 31.

A looping function 716 accesses the work file 702 to identify recurring patterns in the stream of consciousness information. A looping information storage 718 maintains loop pattern information and repeat information which can be supplied to the looping function 716 to facilitate the substitution of existing pattern and repeat information, or the insertion of new pattern and repeat information.

The virtual script editor module 34 can be constructed using the VISUAL C++ programming tool marketed by Microsoft Corporation of Redmond, Wash.

The format of the virtual script 31 created by the virtual script editor module 34 should accommodate the addition of future elements, and should support a C programming interface. The virtual script 31 should identify the following information: the virtual kernel calls and their parameters; indicators for parameter supply mechanism, i.e., hard coded value, valid value list, lookup value, or dynamic variable; specifications for valid value list file; lookup value commands, referencing appropriate queries; dynamic variable (correlated query) specifications; list of acceptable return values for each function; specification of acceptable query/fetch results, both number and values of fields retrieved; event start time and duration or stop time; transaction boundaries; rendezvous points, if any; thread identification for each function call; environment handle identification for each function call; user handle identification for each function call; and request handle identification for each database access.

Figure 8:
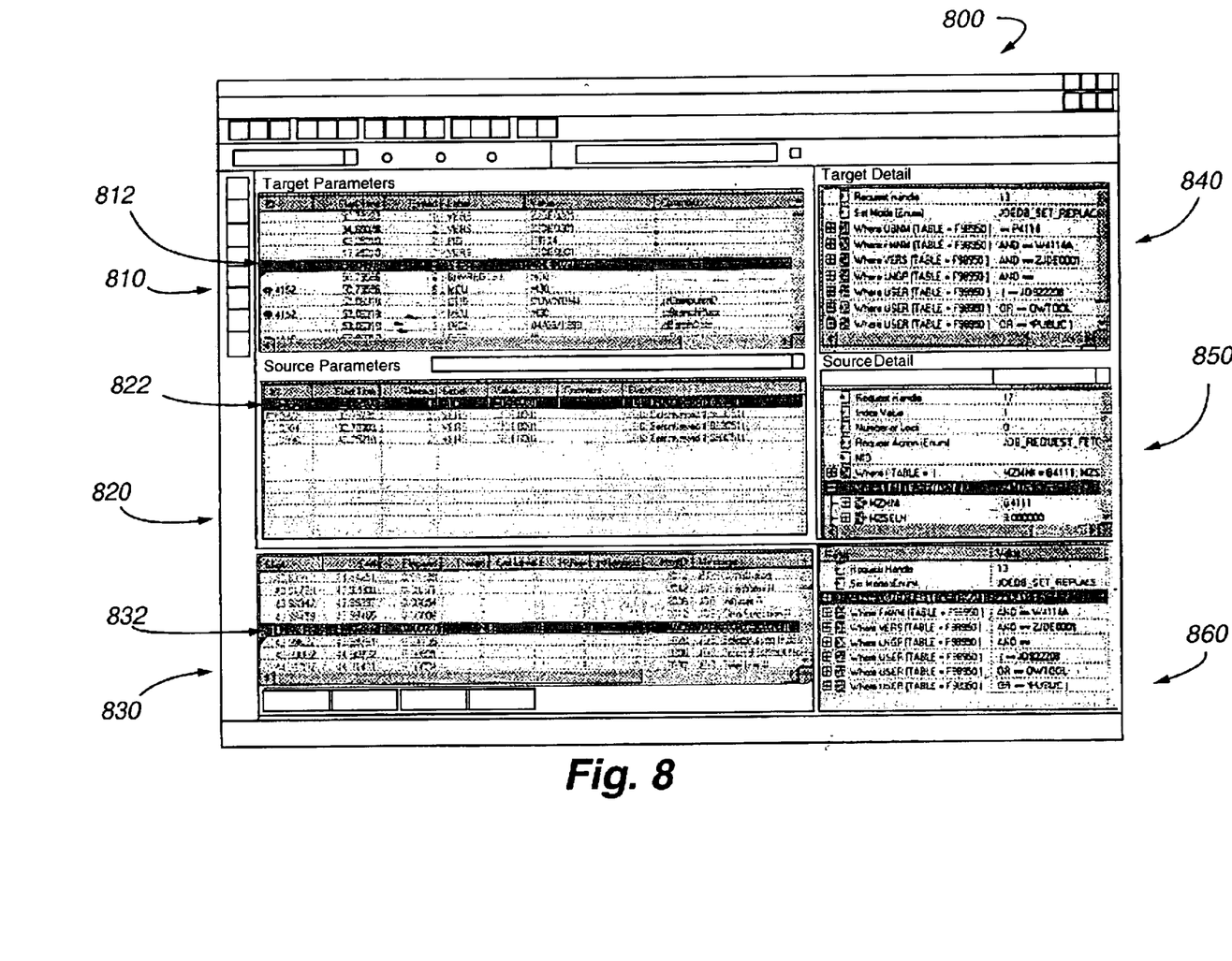
FIG. 8 is a graphical user interface associated with the virtual script editor of FIG. 7.

A graphical user interface ("GUI") 800 displaying information identified by the functions 704, 706, 708, 710 and 712 (FIG. 7) is shown in FIG. 8. The GUI 800 includes a target parameter window 810, a source parameter window 820, a summary window 830, and detail windows 840, 850 and 860 associated with the windows 810, 820 and 830, respectively. In this regard, selections 812, 822 and 832 from the windows 810, 820 and 830, respectively, determine the information displayed in detail windows 840, 850 and 860. The GUI 800 organizes and displays the stream of consciousness information to enable the user to identify or link parameter values as described in more detail below.

Figure 9:
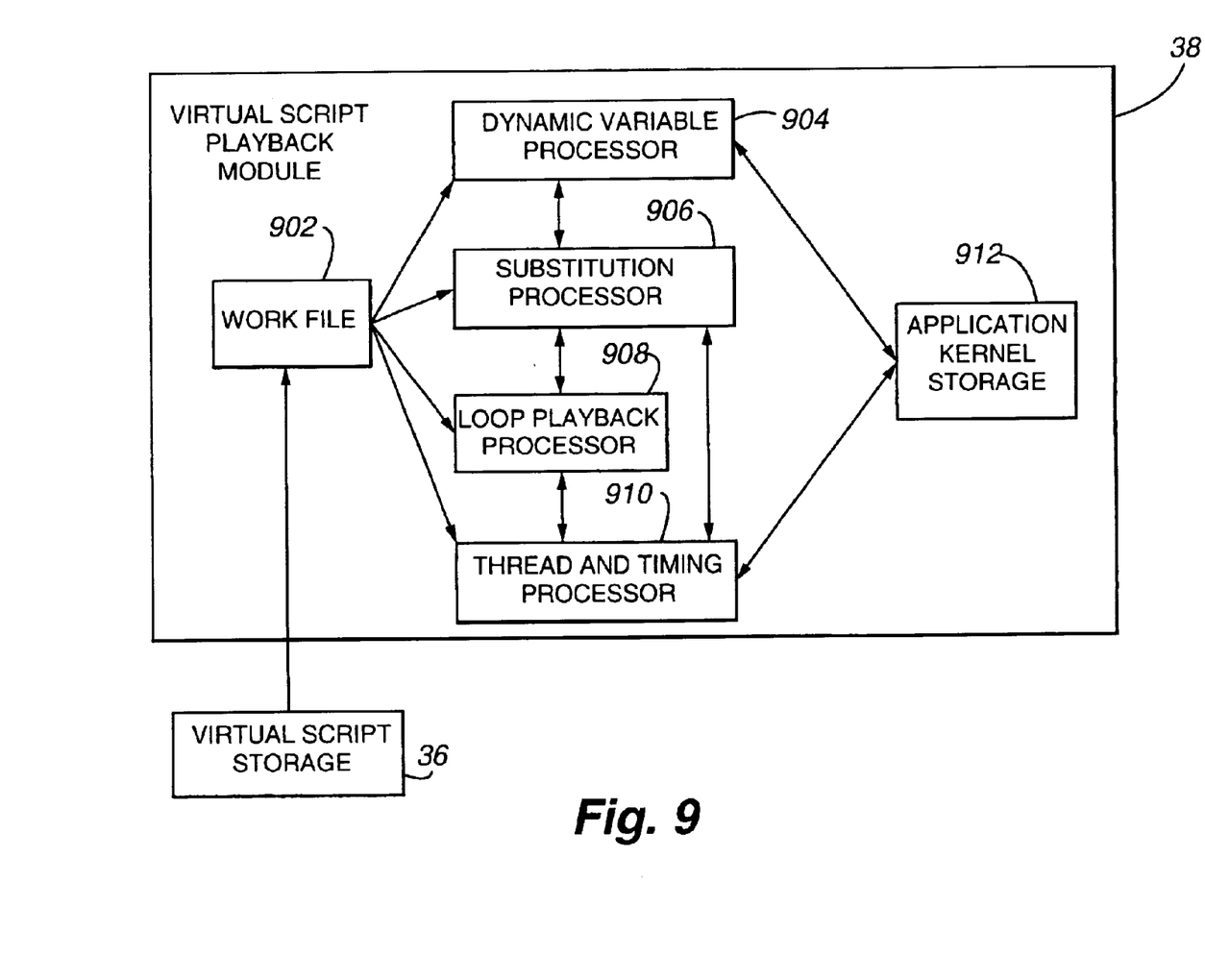
FIG. 9 is a block diagram illustrating a virtual script playback module of the system of FIG. 1.

Considering now the virtual script playback module 38 in greater detail with reference to FIG. 9, the playback module 38 includes a work file 902 to receive the virtual script 31 (FIG. 1) from the virtual script storage 36 for processing by the playback module 38. The playback module 38 further includes a dynamic variable processor 904, a substitution processor 906, a loop playback processor 908 and a thread and timing processor 910 connected to the work file 902 for accessing the retrieved virtual script 31.

The dynamic variable processor 904 initializes values for variables as specified by the virtual script 31, monitors parameter values returned from API calls, and maintains a current value for use by the substitution processor 906. The substitution processor 906 enables the value of a parameter to be replaced with a dynamic value based on the AFTER value of a prior script command. The loop playback processor 908 is responsive to a script replay command to replay a series of script commands for a specified number of times.

The thread and timing processor 910 is responsive to the virtual script 31, the substitution processor 906 and the loop playback processor 908 to make the specified API call within a specified time window and thread.

An application kernel storage 912 connected to the dynamic variable processor 904 and the thread and timing processor 910 maintains an instance of an application kernel. The application kernel includes exposed APIs that will be called by the thread and timing processor 910. The dynamic variable processor 904 monitors the parameter values returned from API calls to the application kernel.

The playback module 38 can be constructed using the VISUAL C++ programming tool marketed by Microsoft Corporation of Redmond, Wash.

Figure 10:
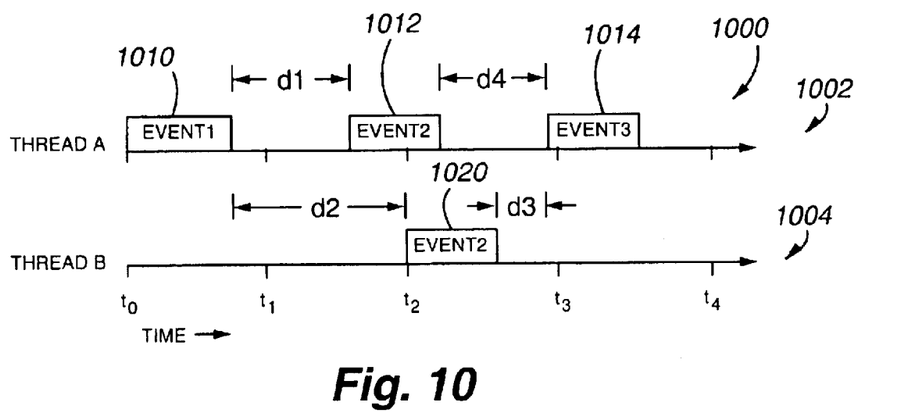
FIG. 10 is a timing diagram illustrating thread information captured during the event capture process of FIG. 4.

Considering now the thread timing characteristics of the captured thread execution information 409 (FIG. 4) with reference to FIG. 10, the captured thread execution information 409 is indicative of a captured, multi-threaded, user session as shown in timing diagram 1000. The diagram 1000 is representative of a captured user session having two threads, THREAD A and THREAD B, and includes a THREAD A time line 1002 and a THREAD B time line 1004. THREAD A includes an EVENT1 1010 beginning at time $t_0$, EVENT2 1012 beginning after an interval time d1 following the end of EVENT1 1010, and an EVENT3 1014 beginning after an interval time d4 following the end of EVENT2 1012. THREAD B includes an EVENT4 1020 beginning at time $t_2$.

As shown in diagram 1000, THREAD A and THREAD B are synchronized both by intra-thread events and by inter-thread events. In this regard, the start times for the intra-thread events EVENT1 1010, EVENT2 1012 and EVENT3 1014 are determined by the start time to and the interval times d1 and d4. In addition, the occurrence of EVENT1 1010, EVENT2 1012, EVENT3 1014 and EVENT4 1020 are inter-threadably related. In this regard, EVENT4 1020 of THREAD B begins after an interval time d2 following the end of EVENT1 1010, and EVENT3 1014 of THREAD A begins after an interval time d3 following the end of EVENT4 1020.

The virtual script editor module 34 (FIG. 7) incorporates the interval times d1, d2, d3 and d4 into the virtual script 31. During the playback of the virtual script 31, the playback module 38 (FIG. 9) uses the interval times d1, d2, d3 and d4 to modify the start times of simulated events. In particular, the playback module 38 modifies an event start time when the duration of a simulated event is different during the playback of the virtual script 31 from the duration of the corresponding captured event. Such a situation can arise when a simulated event takes longer to complete than the corresponding captured event due to increased demand on the servers 3 and 5 (FIG. 1), for example.

To maintain the thread timing characteristics of the captured thread execution information 409 (FIG. 4) in the virtual database kernel level information 640 and the virtual application kernel level information 642 (FIG. 6) generated by the playback module, the playback module 38 utilizes the interval times d1, d2, d3 and d4 for determining simulated event start times for simulated events rather than the captured event start times as the captured event start times do not account for changes in the duration of simulated events during the playback of the virtual script 31. By monitoring the end time of a simulated event, and delaying the start of a subsequent simulated event by the appropriate interval time, the playback module 38 is able to reproduce the captured thread timing characteristics while accounting for changes. Thus, the playback module 38 (FIG. 6) is able to adapt the playback of the virtual script 31 to accommodate changes in simulated event start times which occur during the playback of the virtual script 31.

Figure 11:
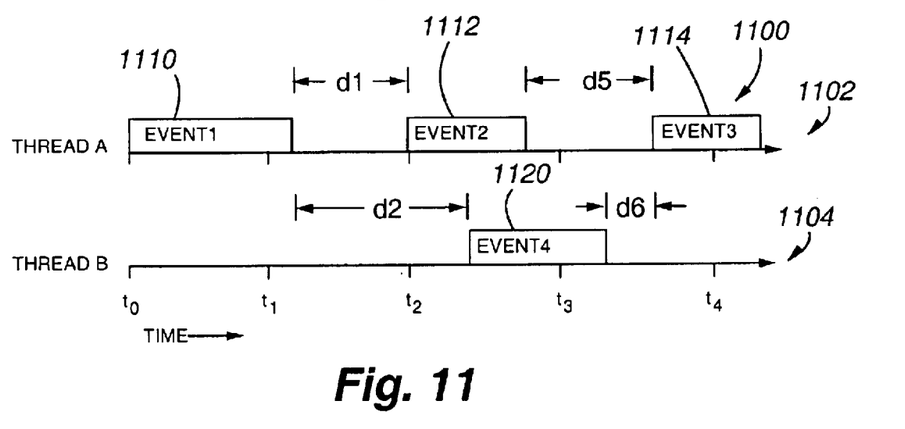
FIG. 11 is a timing diagram illustrating virtual thread information generated during the virtual script playback process of FIG. 6.

Considering now the modification of the captured thread execution information 409 by the playback module 38 with reference to FIG. 11, there is shown a timing diagram 1100 indicative of a simulated user session corresponding to the captured user session (FIG. 10) and having simulated THREAD A and simulated THREAD B, and includes simulated THREAD A time line 1102 and simulated THREAD B time line 1104. The time lines 1102 and 1104 include simulated EVENT1 1110, simulated EVENT2 1112, simulated EVENT3 1114 and simulated EVENT4 1120 corresponding to EVENT1 1010, EVENT2 1012, EVENT3 1014 and EVENT4 1020 of time lines 1002 and 1004 (FIG. 10), respectively.

The timing diagram 1100 is associated with the virtual database kernel level information 640 and the virtual application kernel level information 642 (FIG. 6), and illustrates the modifications made by the playback module 38 during the playback of the virtual script 31. As seen in FIGS. 10 and 11, the EVENT1 1010 and the simulated EVENT1 1110 begin at time $t_0$. However, simulated EVENT1 1110 takes longer to complete than corresponding EVENT1 1010. Rather than initiating simulated EVENT2 1112 at the start time of corresponding EVENT2 1012, simulated EVENT2 1112 begins after the interval time d1, and simulated EVENT4 1120 starts after interval time d2 from the end of simulated EVENT1 1110.

Simulated EVENT3 1114 is intra-threadably related to simulated EVENT2 1112, and starts after an interval time d5 from the end of simulated EVENT2 1112. Simulated EVENT3 1114 is also inter-threadably related to simulated EVENT4 1120, and starts after an interval time d6 following the end of simulated EVENT4 1120. The playback module 38 (FIG. 9) is responsive to changes in the duration of simulated events EVENT1 1110, EVENT2 1112, and EVENT4 1120 for ensuring that simulated EVENT3 1114 does not begin until at least the interval time d3 (FIG. 10) elapses after the end of simulated EVENT4 1120, and the interval time d4 (FIG. 10) elapses after the end of simulated EVENT2 1112. To accomplish this, the playback module 38 ensures that the interval time d5 is greater than or equal to the interval time d4, and that the interval time d6 is greater than or equal to the interval time d3. In this way, the playback module 38 is able to modify the thread timing characteristics of the simulated events 1110, 1112, 1114 and 1120 to ensure that all of the interval times d1, d2, d3, and d4 of the captured information are reflected during the playback of the virtual script 31.

While particular embodiments of the present invention were disclosed, it is to be understood that various different modifications are possible and are contemplated within the true spirit and scope of the appended claims. There is no intention, therefore, of limitations to the exact abstract or disclosure presented herein.

What is claimed is:

1. A system for simulating activity on a multi-tiered computer network, comprising:
   a processor;
   a storage device; and
   software means operative on said processor for identifying parameters and for capturing interface level information and kernel level information associated with said interface level information in said storage device, and for creating a virtual script from said captured interface level information and said kernel level information to produce virtual kernel level information for middleware wherein said virtual kernel level information comprises parameters and associated values indicative of user activity on the multi-tiered computer network wherein the multi-tiered computer network comprises a plurality of servers.

2. A system according to claim 1, wherein said virtual kernel level information includes database information and application information to simulate multi-tier user activity on the computer network.

3. A system according to claim 1, further including a script storage means for storing said virtual script.

4. A system according to claim 3, wherein said script storage means stores a plurality of virtual scripts, each one of said plurality of virtual scripts being representative of an individual simulated user activity.

5. A system according to claim 1, further including playback means responsive to said virtual script for producing said virtual kernel level information.

6. A system according to claim 1, wherein said software means also capture thread information associated with said kernel level information.

7. A system according to claim 6, wherein said virtual script produces said virtual kernel level information with virtual thread information corresponding to said thread information.

8. A system according to claim 7, wherein said thread information includes event information indicative of thread events and event timing information indicative of subsequent thread event start times, and said virtual thread information includes virtual event information indicative of virtual thread events corresponding to said thread events and timed according to said event timing information.

9. A computer-usable storage medium having a computer program embodied therein for causing a computing system having database middleware and application middleware to simulate user activity on a multi-tiered computer network by performing the following steps when the computer program is executed on the computing system:
   supplying virtual database kernel level information to the database middleware to simulate user database activity on the multi-tiered computer network wherein the multi-tiered computer network comprises a plurality of servers;
   storing stream of consciousness information in an event capture database wherein said stream of consciousness information indicates events generated directly or indirectly from user activity; and
   supplying virtual application kernel level information to the application middleware to simulate user application activity on the multi-tiered computer network.

10. A storage medium according to claim 9, wherein the computer program further performs the step of supplying thread information to the database middleware and the application middleware.

11. A system for simulating activity on a multi-tiered computer network, comprising:
   means for capturing interface level information, and for capturing kernel level database information and kernel level application information associated with said interface level information; and
   means for identifying types of values included in at least one of said captured level information, and said captured kernel level database information and kernel level application information; and
   means for creating a virtual script from said captured interface level information, said kernel level database information and said kernel level application information to produce virtual kernel level database information for requesting database services to simulate user activity on the multi-tiered computer network wherein the multi-tiered computer network comprises a plurality of servers.

12. A system according to claim 11, further including a virtual script playback means responsive to said virtual script for producing said virtual kernel level database information and said virtual kernel level application information.

13. A system according to claim 11, further including virtual script storage means for storing said virtual script.

14. A system according to claim 13, wherein said virtual script storage means stores a plurality of virtual scripts, each one of said plurality of virtual scripts being representative of an individual simulated user activity.

15. A system according to claim 11, wherein said capture means also captures thread information associated with said kernel level database information and kernel level application information.

16. A system according to claim 15, wherein said virtual script produces said virtual kernel level database information and said virtual kernel level application information with virtual thread information corresponding to said thread information.

17. A system according to claim 16, wherein said thread information includes event information indicative of thread events and event timing information indicative of subsequent thread event start times, and said virtual thread information includes virtual event information indicative of virtual thread events corresponding to said thread events and timed according to said event timing information.

18. A method for simulating activity on a multi-tiered computer network, comprising:

capturing interface level information;

capturing kernel level database information and kernel level application information associated with said interface level information;

storing stream of consciousness information comprising at least one of said captured interface level information, kernel level database information and kernel level application information wherein the stream of consciousness information indicates events generated directly or indirectly from user activity; and     creating a virtual script from said captured interface level information, said kernel level database information and said kernel level application information to produce virtual kernel level database information for requesting database services and virtual kernel level application information for requesting application services to simulate user activity on the multi-tiered computer network wherein the multi-tiered computer network comprises a plurality of servers.

19. A method according to claim 18, further including producing said virtual kernel level database information and said virtual kernel level application information according to said virtual script.

20. A method according to claim 18, further including storing said virtual script.

21. A method according to claim 20, further including storing a plurality of virtual scripts, each one of said plurality of virtual scripts being representative of an individual simulated user activity.

22. A method according to claim 18, further including capturing thread information associated with said kernel level database information and kernel level application information.

23. A method according to claim 22, further including producing said virtual kernel level information and said virtual kernel level application information with virtual thread information corresponding to said thread information.

24. A method according to claim 23, wherein said thread information includes event information indicative of thread events and event timing information indicative of subsequent thread even start times, and said virtual thread information indicative of virtual thread events corresponding to said thread events, the method further including timing the occurrence of said virtual thread events according to said event timing information.

25. A system for simulating user activity on a multi-tiered computer network, comprising:

storage means for maintaining service request information including parameter information, and for maintaining thread information including interval information, wherein said parameter information comprises information identifying parameters;

editor means for selectively linking said parameter information to generate virtual user session information, and for incorporating said thread information into said virtual user session information; and     playback means responsive to said virtual user session formation and said interval information for generating virtual kernel level information indicative of the user activity wherein the multi-tiered computer network comprises a plurality of servers.

\* \* \* \* \*